United States Patent
Lin (10) Patent No.: US 8,498,340 B2
(45) Date of Patent: Jul. 30, 2013

(54) METHOD AND DEVICE FOR DECODING AND DISPLAYING VIDEO FRAMES

(75) Inventor: Chan-Shih Lin, Tainan (TW)

(73) Assignee: Himax Technologies Limited, Tainan (TW)

( * ) Notice: Subject to any disclaimer, the term of this patent is extended or adjusted under 35 U.S.C. 154(b) by 1830 days.

(21) Appl. No.: 11/397,349

(22) Filed: Apr. 4, 2006

(65) Prior Publication Data

US 2007/0229523 A1    Oct. 4, 2007

(51) Int. Cl.
*H04N 7/12* (2006.01)
*H04N 11/02* (2006.01)

(52) U.S. Cl.
USPC .................. 375/240.25; 375/240.15

(58) Field of Classification Search
USPC ........................ 375/240.01–240.26
See application file for complete search history.

(56) References Cited

U.S. PATENT DOCUMENTS

| | | | | |
|---|---|---|---|---|
| 6,122,315 A * | 9/2000 | Barnes | ..................... | 375/240.12 |
| 7,206,347 B2 * | 4/2007 | Lim et al. | ................. | 375/240.25 |
| 7,634,010 B2 * | 12/2009 | Soh et al. | ................. | 375/240.24 |
| 2004/0264570 A1 * | 12/2004 | Kondo et al. | ............ | 375/240.16 |
| 2005/0163220 A1 * | 7/2005 | Takakura et al. | ........ | 375/240.16 |

* cited by examiner

*Primary Examiner* — Richard Torrente
(74) *Attorney, Agent, or Firm* — Baker & McKenzie LLP (57) ABSTRACT

A method of decoding and displaying video frames and an apparatus thereof are disclosed. The method includes indexing the first portion of a buffer with the first reference number, said first portion to be stored with the first reference frame; changing said first reference number to the second reference upon detecting the second reference frame to be stored in the second portion of said buffer; storing the third reference frame in the third portion of said buffer; and displaying said first reference frame associated with said second reference number, wherein storing said third reference frame in said third portion performs simultaneously with displaying said first reference frame.

15 Claims, 6 Drawing Sheets

METHOD AND DEVICE FOR DECODING AND DISPLAYING VIDEO FRAMES

FIELD OF THE INVENTION

This invention relates generally to the field of decoding and displaying video frames. In particular, certain embodiments of the present invention relate to the field of decoding and displaying video frames in accordance with an MPEG-2 compression scheme.

BACKGROUND OF THE INVENTION

Conventionally, a compression scheme is used to resolve the problem that digital video consumes large amounts of storage and transmission capacity. In a predetermined standard scheme such as MPEG-2 (Moving Pictures Experts Group 2), a digital video sequence is compressed into individual pictures, such as I-frames, P-frames, and B-frames. An I-frame is a frame constructed without reference to any other frames. A P-frame is predicted from (i.e., constructed with reference to a) preceding P-frame or I-frame. A B-frame is predicted from (i.e., constructed with reference to) one preceding reference frame and one following reference frame (i.e., from two P-frames, or from one I-frame and one P-frame). Predictive encoding introduces dependencies in the encoded data so that the compression ratio can be improved.

However, if an encoded video frame is lost during transmission or arrives late at a decoder, not only will the frame miss its respective display time, but the missed frame may prevent other frames depending upon it from being properly displayed. In the example above, if a P-frame cannot be decoded because a preceding I-frame or P-frame is lost, other subsequent frames dependent on that P-frame may be unable to be decoded as well.

Figure 1:
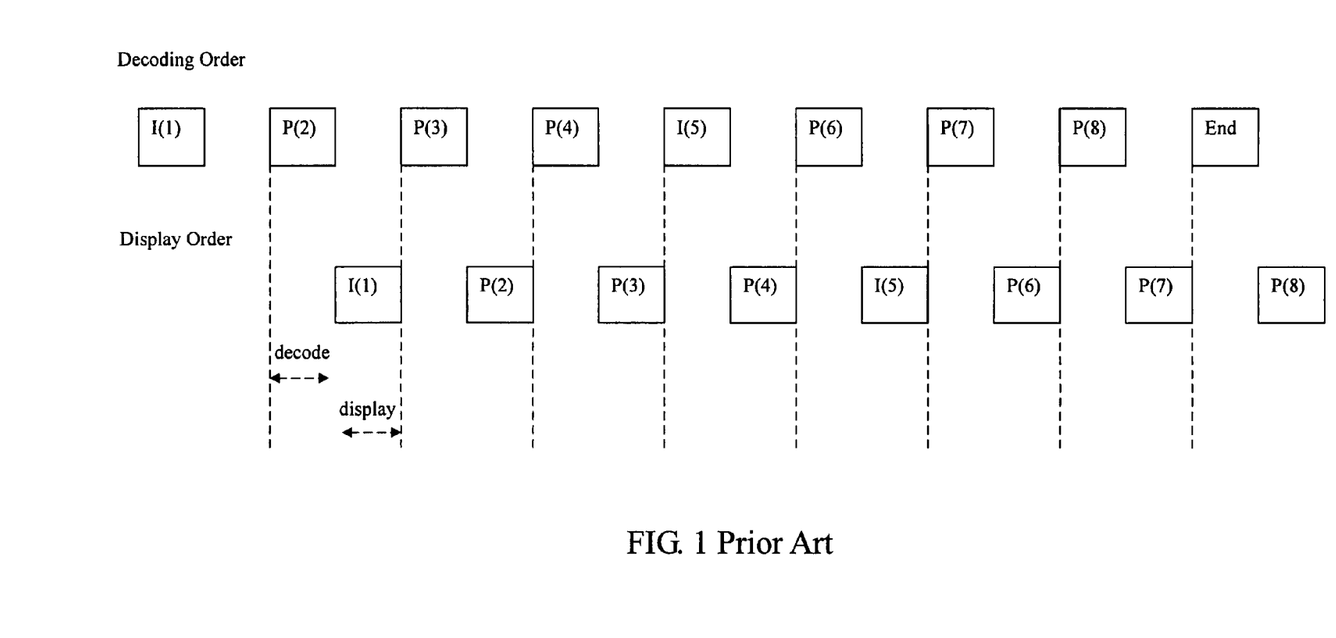
FIG. 1 is a schematic diagram showing conventional decoding and display orders without B-frames.

In ISO/IEC 13818-2 section 6.1.1.1.1, a three buffer solution with two reference frames (I/P) and one auxiliary frame (B) is provided in accordance with the following rules. The order of coded frames in a bit-stream is referred to as the "coded order." As shown in FIG. 1, in a sequence containing no B-frames, if the current frame in the coded order is an I-frame or P-frame, the next frame output to the display unit is the frame reconstructed from the previous I-frame or P-frame if one exists. If none exists, at the start of the sequence, no frame is output. When the end of the sequence is detected or the last coded frame in the sequence is removed from the buffer, the next output frame for the display unit is the final I-frame or P-frame. In this case, the coded order is the same as the display order.

Figure 2:
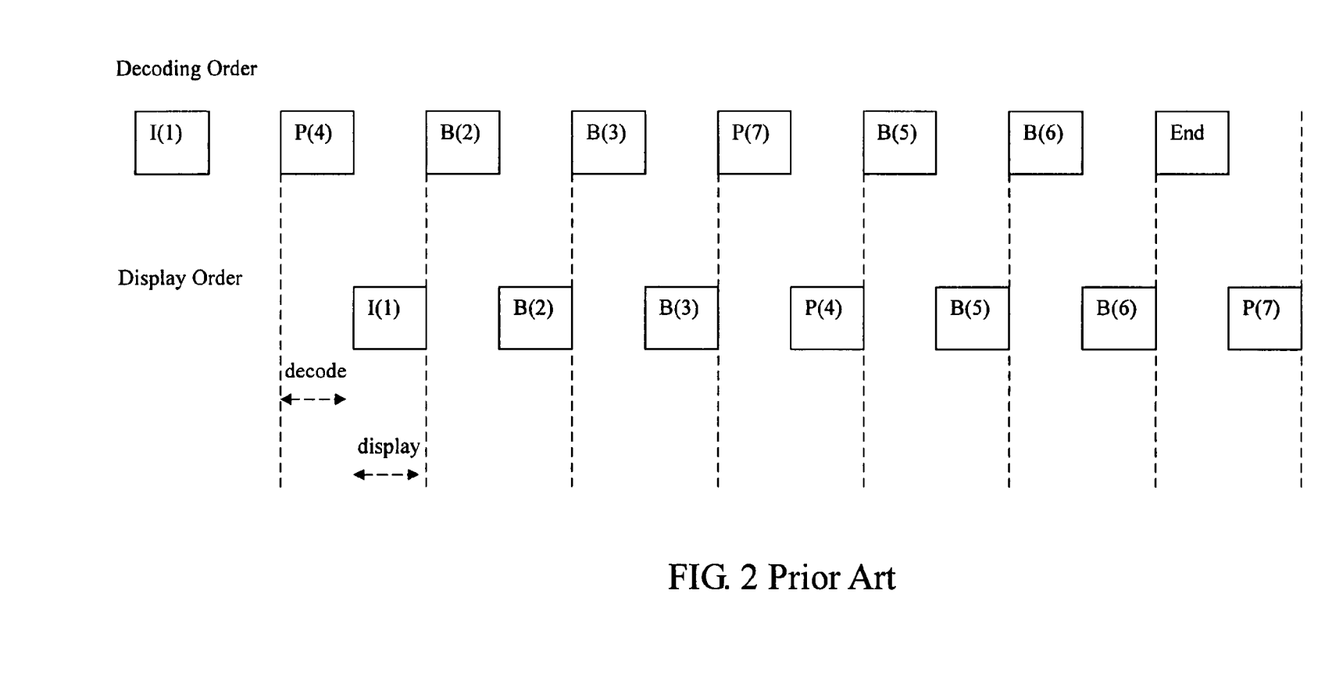
FIG. 2 is a schematic diagram showing conventional decoding and display orders with B-frames.

FIG. 2 illustrates a scenario wherein B-frames are present in the sequence. In this scenario, an additional rule is applied: if the current frame in coded order is a B-frame, the next frame output to the display unit is the current frame reconstructed from a previously reconstructed B-frame. As shown in both FIG. 1 and FIG. 2, the decoder and the display unit share one frame period throughout the sequence. Thus, the decoder must have sufficient computation ability to meet this requirement. This can be difficult for MPEG-2 video decoders, particularly for HDTV applications.

Therefore, there is a need for decoding and displaying video frames simultaneously. Additionally, a method and apparatus that can not only maintain the anchor buffer position so as to easily reconstruct pictures, but also satisfy the display re-order requirement of ISO/IEC 13818-2 is desired.

SUMMARY OF THE INVENTION

In order to achieve the above-identified objects, a method and apparatus for decoding and displaying video frames is described.

According to certain embodiments of the present invention, a method for decoding and displaying video frames includes storing a first reference frame in a first portion of a buffer; indexing the first portion of the buffer with a first reference number; upon detecting a second reference frame, changing the reference number associated with said first portion from said first reference number to a second reference number, associating said first reference number with a second portion of said buffer and storing said second reference frame in said second portion; upon detecting a third reference frame, storing said third reference frame in a third portion of said buffer and simultaneously displaying said first reference frame associated with said second reference number.

According to certain embodiments of the present invention, storing said second reference frame in said third portion is performed simultaneously with displaying said first reference frame.

According to certain embodiments of the present invention, the method includes storing a first bi-directional frame in a first portion of a buffer; and storing a second bi-directional frame in a second portion of said buffer while displaying said first bi-directional frame.

According to certain embodiments of the present invention, the method includes detecting the first decoded frame and determining whether it is a reference frame; if said first decoded frame is a reference frame, indexing a first portion of a buffer with a first reference number and storing said first decoded frame in said first portion; if said first decoded frame is a bi-directional frame, storing said first decoded frame in a second portion of said buffer; detecting a second decoded frame and determining whether it is a reference frame; if said second decoded frame is a reference frame, indexing a third portion of said buffer with said first reference number, re-indexing said first portion of said buffer with a second reference number and storing said second decoded frame in said third portion; if said second decoded frame is a bi-directional frame, storing said second decoded frame in a fourth portion of said buffer; detecting a third decoded frame; storing said third decoded frame in a fifth portion of said buffer and simultaneously displaying said first decoded frame.

According to certain embodiments of the present invention, a decoding and displaying apparatus includes a decoding element configured to decode a video frame and determine whether it is a reference frame or a bi-directional frame; a storing element coupled to said decoding element for storing video frames in portions thereof, said storing element having an initial reference number assigned to each portion of said storing element; a displaying element coupled to said storing element, said displaying element displaying a video frame stored in a portion of said storing element associated with a first reference number.

DETAILED DESCRIPTION OF THE INVENTION

Examples of certain embodiments of the present invention are illustrated in the accompanying drawings, wherein like reference numbers refer to like elements throughout the specification.

Figure 3:
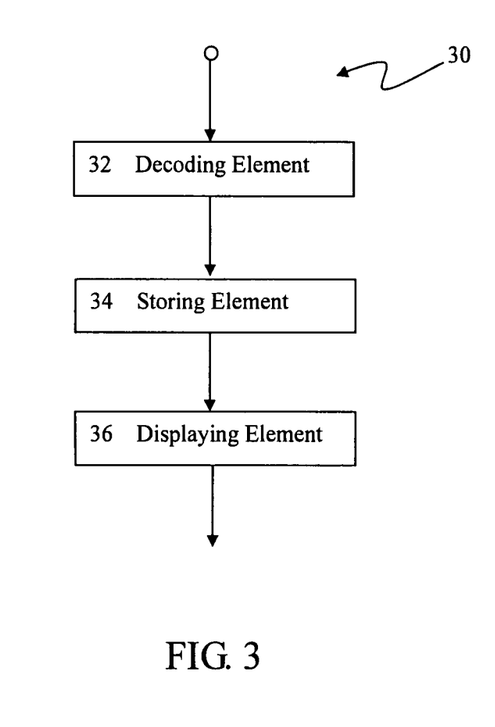
FIG. 3 is a block diagram showing a decoding and displaying apparatus according to certain embodiments of the present invention.

FIG. 3 illustrates a decoding and displaying apparatus 30 according to certain embodiments of the present invention. The decoding and displaying apparatus 30 not only decodes and displays video frames simultaneously, but also satisfies the display re-order requirement in ISO/IEC 13818-2.

Referring to FIG. 3, the decoding and displaying apparatus 30 of the present invention includes a decoding element 32, a storing element 34, and a displaying element 36. The decoding element 32 (e.g., a decoder) receives information for a compressed sequence of digital video from an encoding element (not shown) and produces output including reconstructed pictures, such as reference frames and bi-directional frames. Herein, reference frames refer to I-frames and P-frames, whereas bi-directional frames refer to B-frames.

The storing element 34 is coupled to the decoding element 32, and stores the output from the decoding element 32, namely the reference frames and the bi-directional frames, in respective portions of the storing element 34. The storing element 34 has an initial reference number, such as reference number zero, associated with each portion. According to certain embodiments of the present invention, the storing element 34 has four portions, two portions for storing reference frames (I-frames and/or P-frames) and two portions for storing bi-directional frames (B-frames). Additionally, the storing element 34 changes the reference number associated with each portion based upon the detection of the output of the decoding element 32. As a result, a reference frame can be decoded at the same time that a bi-directional frame is displayed, or vice versa. Details of how the storing element 34 changes the reference numbers will be explained later in reference to FIG. 4, FIG. 5 and FIG. 6.

Coupled to the storing element 34 is the displaying element 36. The displaying element 36 displays video frames stored in the storing element 34. If B-frames are not present in the coded order, the displaying element 36 displays the video frames in the same sequence as the coded order. If B-frames are present in the coded order, the displaying element 36 displays the video frames in a sequence different from the coded order.

Figure 4:
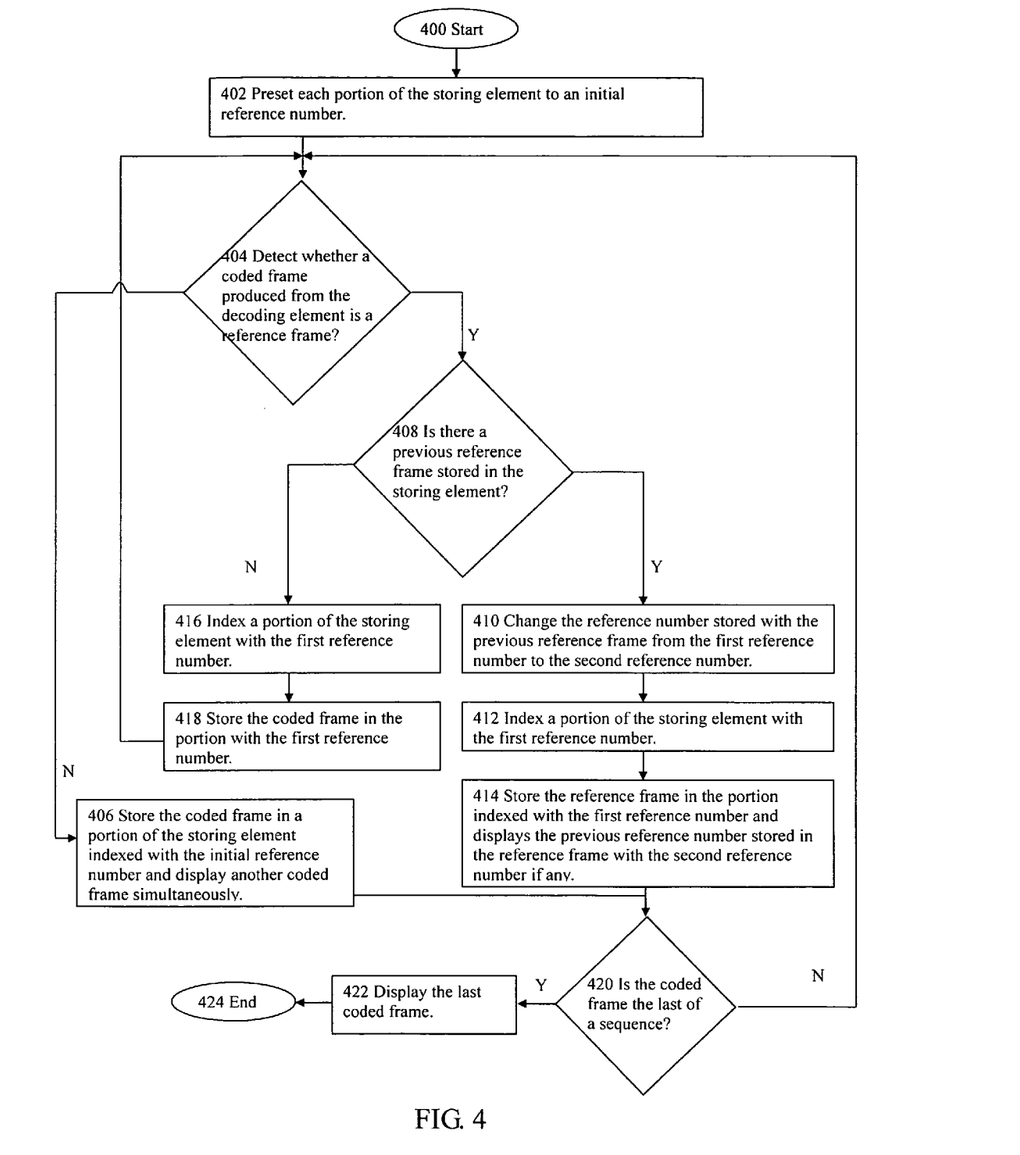
FIG. 4 is a flow chart of decoding and displaying video frames according to certain embodiments of the present invention.

Referring to FIG. 4, a method of decoding and displaying video frames in accordance with certain embodiments of the present invention is illustrated. The method starts at step 400. At step 402, the storing element 34 presets each portion of the storing element to an initial reference number, such as reference number zero. Next, at step 404, the storing element 34 detects a coded frame produced from the decoding element 32 and determines if the coded frame is a reference frame, such as an I-frame. If the coded frame is not a reference frame, then it is a bi-directional frame, namely a B-frame. In this case, at step 406 the storing element 34 stores the coded frame in a portion of the storing element 34 indexed with the initial reference number. Since a B-frame is predicted from two reference frames, such as two P-frames or an I-frame and a P-frame, at least one reference frame must have previously been stored in a portion of the storing element 34. In the case where there are two reference frames already stored in the storing element 34, storing the bi-directional frame is performed simultaneously with displaying one of the previously stored coded frames.

If at step 404, the storing element 34 detects that a reference frame is produced from the decoding element 32, then the storing element 34 further determines if there is a previous reference frame stored in the storing element 34 at step 408. If so, at step 410 the storing element 34 changes the number associated with the previous reference frame from the first reference number to the second reference number. By doing so, the previous reference frame is changed from the backward anchor frame to the forward anchor frame. At step 412, the storing element 34 indexes a portion of the storing element 34 previously indexed to the initial reference number, to the first reference number. At step 414, the storing element 34 then stores the reference frame in the buffer portion indexed to the first reference number, such that the reference frame now serves as the backward anchor frame. Simultaneously, the displaying element 36 displays the reference frame that had been associated with the second reference number, (i.e., the old forward anchor frame) if any. In other words, displaying a forward anchor frame is performed simultaneously with storing a backward anchor frame.

According to certain embodiments of the present invention, the decoding element 32 notifies the displaying element 36 whether to next display (i) the reference frame associated with the second reference number or (ii) a bi-directional frame stored in the storing element 34, thereby allowing, at the next time interval, the decoding element 32 to decode another video frame while the displaying element 36 displays the frame indicated by the decoding element 32.

At step 420, it is determined whether the coded frame is the last of the sequence. If so, the displaying element 36 displays the last coded frame regardless of whether the coded frame is stored in the portion of the storing element 34 associated with the second reference number. The process terminates at step 422. If the coded frame is not the last of the sequence, the process returns to step 404, detecting whether the next coded frame provided by the decoding element 32 is a reference frame. The steps 408, 410, 412, 414 and 420 are repeated until the coded frame is the last frame of the sequence.

Figure 5:
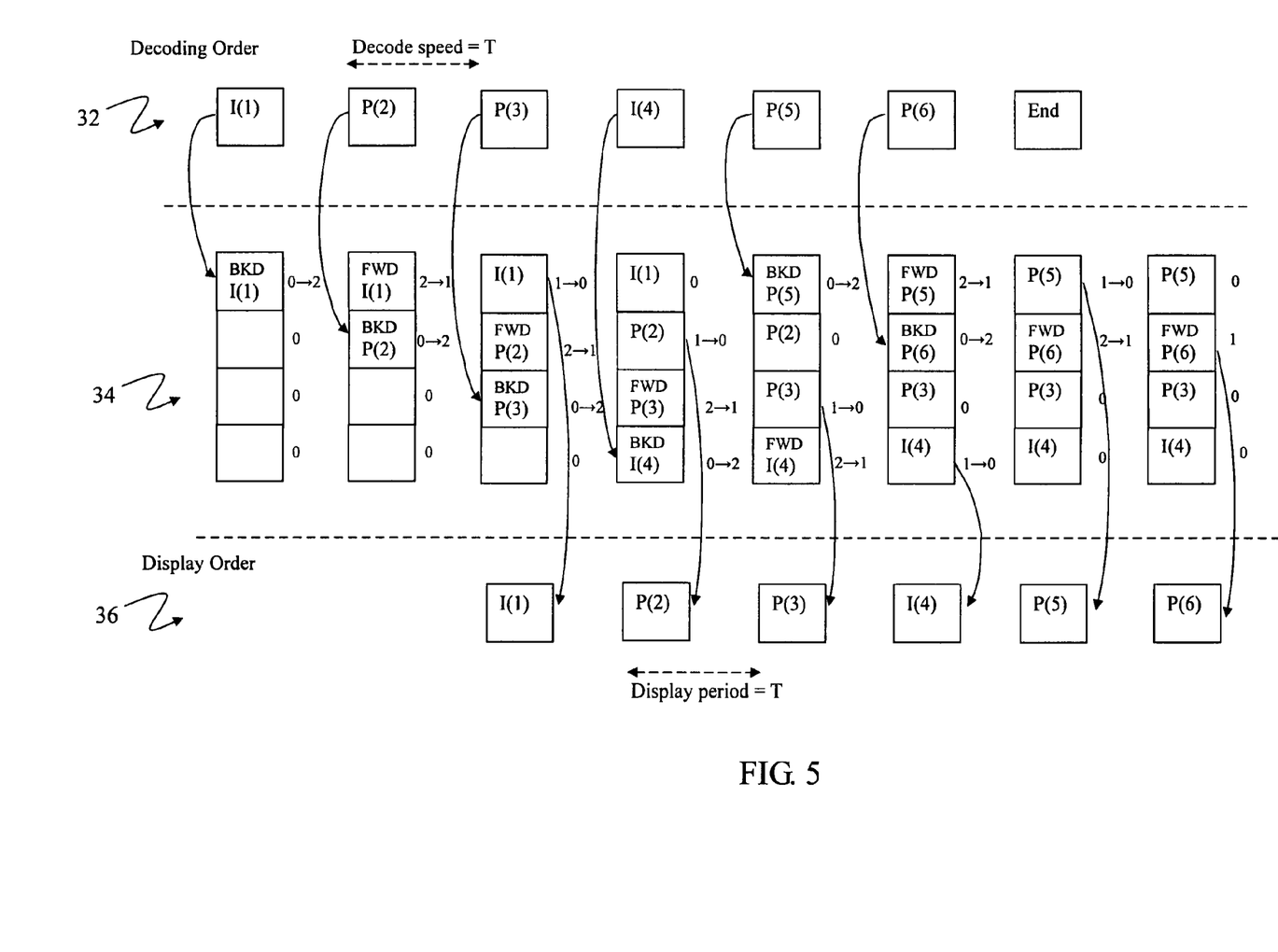
FIG. 5 a schematic diagram showing decoding and display orders without B-frames according to certain embodiments of the present invention.

FIG. 5 illustrates a decoding order without B-frames. Referring to FIG. 5, when the reference frame I(1) is detected in the output of the decoding element 32, the storing element 34 changes the reference number associated with the first portion from zero (the initial reference number) to two (step 412). According to certain embodiments of the present invention, reference number two indicates that the reference frame I(1) is the backward anchor frame.

Referring to the FIG. 5, when a second reference frame P(2) is detected, at step 408 the storing element 34 determines whether there is a previous reference frame stored in the storing element 34. If so, at step 410 the storing element 34 changes the reference number associated with the previous reference frame from a first reference number (two) to a second reference number (one). The storing element then indexes a different portion of the storing element with the first reference number (two) at step 412 and stores the second reference frame (P(2)) in that portion at step 414. According to certain embodiments of the present invention, a reference number having the value one means the corresponding frame is the forward anchor frame, which in turn means that the P-frame P(2) will be displayed when the next reference frame is detected and stored.

When the third reference frame P(3) is produced from the decoding element 32 at step 420 the storing element 34 determines first that the coded frame is not the last of a sequence and second, after returning to step 404, that the coded frame is another reference frame. In this example, the reference frame I(4) is produced next, and the steps 404, 408, 410, 412 and 414 are repeated.

At step 414, the storing element 34 stores the newly decoded reference frame P(5) in the portion indexed with the first reference number, while the displaying element 36 displays the reference frame previously associated with the second reference number (in this example, P(3)). At step 420 it is determined whether the coded frame is the last of the sequence. Steps 404, 408, 410, 412, and 414 are repeated until at step 420 the storing element 34 determines that the coded frame is the last of the sequence (in this example, P(6)). If so, at step 422 the last coded frame is displayed, and the process then ends at step 424.

Referring to FIG. 5, the decode speed of the decoding element 34 is set to match the display speed of the displaying element 36. Because the displaying element 36 delays displaying a frame for an amount of time equal to two cycles of the decoding element 32 (i.e., the decode period times two), the decoding element 34 can decode one reference frame simultaneously with the displaying element 36 displaying another reference frame.

Figure 6:
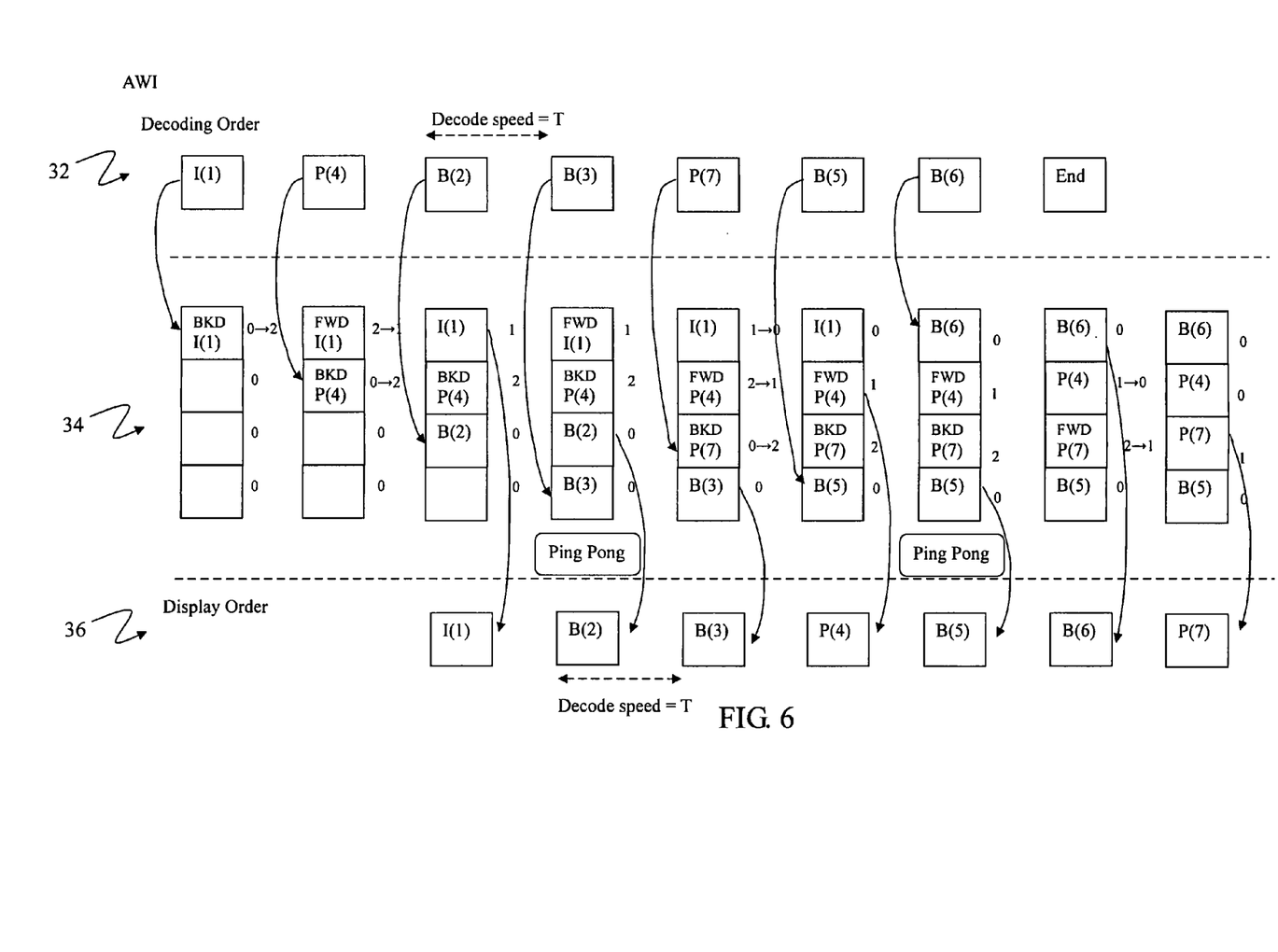
FIG. 6 is a schematic diagram showing decoding and display orders with B-frames according to certain embodiments of the present invention

FIG. 6 illustrates a decoding order of a sequence that contains B-frames according to certain aspects of the present invention. Referring to FIG. 6, when the first reference frame (in this example, I(1)) is detected, the storing element 34 stores the reference frame in a first portion and changes the reference number associated with that portion from the initial reference number (zero) to a first reference number (two), at step 412. When a second reference frame is detected (in this example, P(4)) at step 408, the storing element 34 first determines whether there is a previous reference frame stored in the storing element 34. If so, as in this example, at step 410 the storing element 34 changes the reference number associated with the previous reference frame (I(1)) from the first reference number (two) to the second reference number (one). The storing element 34 then indexes a different portion of the storing element 34 with the first reference number (two) at step 412, and stores the second reference frame (P(4)) in that portion at step 414.

Referring again to FIG. 6, at step 404 the third decoded frame (B(2)) is determined to be a bi-directional frame. Consequently, the storing element 34 stores the bi-directional frame in a portion of the storing element 34 indexed with the initial reference number (zero). Simultaneously, the forward anchor frame (i.e., the reference frame associated with the second reference number, in this example I(1)) is displayed a step 406.

When the fourth decoded frame (B(3)) is produced and determined not to be a reference frame at step 404, it is stored in a portion of the storing element 34 indexed with the initial reference number (zero). However, in contrast to the previous scenario, there is now no forward anchor frame to be displayed. Accordingly, the third B-frame (B(2)) is displayed by the displaying element 36 at the same time that the fourth B-frame (B(3)) is stored in the storing element 34. This creates a "ping-pong" situation where the decoding element 32 has only one display period to reconstruct the B-frame B(3) before it will be displayed by the displaying element 36, i.e., the bi-directional frame (B(3)) is being decoded while the immediately preceding bi-directional frame (B(2)) is simultaneously being displayed.

According to certain embodiments of the present invention, the decoding element 32 notifies the displaying element 36 whether (i) a reference frame, namely the reference frame associated with the second reference number, or (ii) a bi-directional frame stored in the storing element 34 is to be displayed next. Accordingly, at the next time interval the decoding element 32 can decode another video frame while the displaying element 36 displays the frame previously marked by the decoding element 32.

The process continues to step 420 to determine whether the coded frame is the last of the sequence. If not, the step goes back to step 404. As shown in FIG. 6, the third reference frame (P(7)) is produced from the decoding element 32. Thus, the steps 404, 408, 410, 412 and 414 are repeated.

Referring again to FIG. 6, the next frame in coded order is the bi-directional frame B(5). As described above, when a bi-directional frame is detected, steps 406 and 420 are repeated. Next in sequence is the bi-directional frame B(6) thus steps 406 and 420 are repeated again. After (B(5) and B(6) are displayed, the storing element 34 determines at step 420 that P(7) is the only frame left in the storing element 34 (i.e., that P(7) is the last frame of the sequence). Accordingly, the displaying element 36 displays the last coded frame at step 422. The process then ends at step 424.

As shown in both FIG. 5 and FIG. 6, the storing element 34 pre-sets all portions to an initial reference number (here, zero). Additionally, the storing element 34 also resets the reference number for a portion back to the initial reference number once the reference frame stored therein has been displayed.

In addition to the embodiments described above, other embodiments are possible that are within the scope and spirit of the present invention.

What is claimed is:

1. A method implemented in an apparatus for decoding and displaying video frames, wherein the apparatus includes a decoding element, a storing element and a displaying element, and wherein said method when executed by the apparatus, causes the apparatus to perform a plurality of steps comprising:

providing a plurality of predetermined reference numbers indicative of different states associated with multiple portions in a buffer of the storing element, the reference numbers including an initial reference number indicating that an associated portion of the buffer is available for storing a new reference frame, a first reference number indicating that the associated portion of the buffer contains a newly-stored reference frame, and a second reference number indicating that the associated portion of the buffer is storing a reference frame that is to be next displayed, the second reference number thereby indicating which one among the reference frames stored in the buffer is to be next displayed;

storing a first reference frame decoded by the decoding element in a first portion of a buffer that has the initial reference number;

changing the reference number of the first portion where the first reference frame is stored from the initial reference number to the first reference number;

storing a second reference frame decoded by the decoding element in a second portion of said buffer that has the initial reference number, wherein the second reference frame immediately follows the first reference frame in a decoding sequence of the decoding element;

changing the reference number associated with the first portion of said buffer where the first reference frame is stored from the first reference number to the second reference number, and associating the first reference number to the second portion of said buffer where the second reference frame is newly stored; and after the first portion of the buffer is changed to the second reference number, concurrently displaying the first reference frame stored in the first portion of the buffer as a third reference frame is newly stored in a third portion of said buffer.

2. The method of claim 1, further comprising: before the step of storing the first reference frame, associating all portions of said buffer with the initial reference number.

3. The method of claim 2, further comprising: after the step of displaying the first reference frame, associating the first portion of said buffer with the initial reference number.

4. The method of claim 1, further comprising: storing a first bi-directional frame in a fourth portion of said buffer.

5. The method of claim 4, further comprising:
storing a second bi-directional frame in a portion of said buffer associated with the initial reference number; and
displaying said first bi-directional frame, simultaneously with the step of storing said second bi-directional frame.

6. The method of claim 1, further comprising:
detecting that said third reference frame is the last one of a sequence; and
displaying said third reference frame.

7. The method of claim 1, further comprising: marking said first reference frame associated with said second reference number to be displayed in a next time interval.

8. A decoding and displaying apparatus, comprising:
a decoding element configured to decode and output a plurality of video frames according to a decoding sequence, wherein the video frames include a plurality of reference frames;
a storing element coupled to said decoding element for successively storing one at a time each reference frame outputted from the decoding element into a buffer, wherein the storing element is configured to:
assign a first index value to each reference frame that is outputted from the decoding element and is newly stored in the buffer, and a second index value to each reference frame previously stored in the buffer that is to be next displayed; and
change the index value of one first reference frame currently stored in the buffer from the first index value to the second index value each time a second reference frame outputted from the decoding element immediately following the first reference frame in a decoding sequence of the decoding element is newly stored in the buffer; and
a displaying element coupled to said storing element, wherein the displaying element is configured to display the reference frame in the buffer associated with the second index value, whereby the second index value is configured as an indicator of which one among the reference frames stored in the buffer is to be next displayed.

9. The method of claim 1, wherein the first, second and third reference frame are successively stored one at a time in the buffer.

10. The apparatus of claim 8, wherein the displaying element displays the reference frame associated with the second index value and the storing element stores a new reference frame outputted from the decoding element in the buffer in a concurrent manner.

11. A method implemented in an apparatus for decoding and displaying video frames, wherein the apparatus includes a decoding element, a storing element and a displaying element, and wherein the method when executed by the apparatus, causes the apparatus to perform a plurality of steps comprising:
providing a set of predetermined index values indicative of different states associated with reference frames stored in a buffer of the storing element, the index values including a first index value associated with each reference frame that is newly stored in the buffer, and a second index value associated with each reference frame stored in the buffer that is to be next displayed;
decoding a first reference frame and storing the first reference frame in a first portion of a buffer;
associating the first index value with the first portion of the buffer where the first reference frame is newly stored;
decoding a second reference frame and storing the second reference frame in a second portion of the buffer, wherein the second reference frame immediately follows the first reference frame in a decoding sequence of the decoding element;
changing the index value of the first portion of the buffer where the first reference frame is currently stored from the first index value to the second index value, and associating the first index value to the second portion of the buffer where the second reference frame is newly stored; and
displaying the first reference frame stored in the first portion of the buffer after the first portion is associated with the second index value.

12. The method of claim 11, wherein the first portion of the buffer is initialized to an initial index value before the first reference frame is stored therein, the initial index value being associated with each portion of the buffer that is available for storing a new reference frame.

13. The method of claim 12, further comprising initializing the first portion of the buffer to the initial index value after the step of displaying the first reference frame.

14. The method of claim 11, further comprising concurrently storing a third reference frame in a third portion of the buffer as the step of displaying the first reference frame is performed.

15. The method of claim 14, further comprising:
initializing the first portion of the buffer to an initial index value after the step of displaying the first reference frame, the initial index value being associated with each portion of the buffer that is available for storing a new reference frame; and
changing the index value associated with the second portion of the buffer where the second reference frame is stored from the first index value to the second index value, and associating the first index value with the third portion where the third reference frame is stored.

* * * * *